(12) United States Patent
Dobbins

(10) Patent No.: US 6,301,934 B1
(45) Date of Patent: *Oct. 16, 2001

(54) METHOD OF MAKING A DISPERSION-MANAGED OPTICAL FIBER WITH VARYING THE FEED RATES OF AN RIT PROCESS

(75) Inventor: Michael S. Dobbins, Painted Post, NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,187
(22) PCT Filed: Feb. 11, 1997
(86) PCT No.: PCT/US97/02163
  § 371 Date: Aug. 13, 1998
  § 102(e) Date: Aug. 13, 1998
(87) PCT Pub. No.: WO97/30944
  PCT Pub. Date: Aug. 28, 1997

Related U.S. Application Data
(60) Provisional application No. 60/012,181, filed on Feb. 23, 1996.

(51) Int. Cl.[7] .................................................. C03B 37/027
(52) U.S. Cl. .............................. 65/381; 65/382; 65/412
(58) Field of Search ............................ 65/412, 381, 382, 65/408

(56) References Cited

U.S. PATENT DOCUMENTS

| | | |
|---|---|---|
| 3,909,110 | * 9/1975 | Marcuse . |
| 4,049,413 | 9/1977 | French . |
| 4,578,096 | * 3/1986 | Siegmund . |

FOREIGN PATENT DOCUMENTS 42 33 869   11/1993   (DE) .

* cited by examiner

*Primary Examiner*—John Hoffmann
(74) *Attorney, Agent, or Firm*—Timothy R. Krogh; Scott S. Servilla

(57) ABSTRACT

The invention is a method of making an optical fiber or cane (600) that has optical properties that vary axially. Core glass (100) and clad glass (200) are fed into a furnace to form the cane or fiber. The velocities of the feeding of the clad and core are controlled so that the total combined mass per unit time is constant. The diameter of the core (604) varies along the length of the fiber or cane in accordance with the control of the velocities. The variance in the core diameter results in the variance of the axial optical properties of the fiber or cane.

21 Claims, 2 Drawing Sheets

METHOD OF MAKING A DISPERSION-MANAGED OPTICAL FIBER WITH VARYING THE FEED RATES OF AN RIT PROCESS

CROSS-REFERENCE TO RELATED APPLICATIONS

This application is based upon U.S. Provisional Application Ser. No. 60/012,181 filed on Feb. 23, 1996, from which the benefit of priority is hereby claimed.

BACKGROUND OF THE INVENTION

This invention relates to methods of making optical fiber having longitudinally varying optical properties. Optical fibers made in accordance with the invention may include dispersion decreasing and dispersion managed fiber. Such fibers may be used for soliton pulse transmission, in which an optical soliton pulse maintains its original shape as it travels along the optical fiber. However, the invention is not limited to this application.

Dispersion refers to the spreading out of light pulses as they travel in an optical fiber. Such spreading of a soliton pulse causes attenuation losses as the pulse travels along the fiber. Dispersion may be compensated for by changing the optical properties of the fiber so as to reduce the total dispersion. Two types of fiber which compensate for dispersion are dispersion decreasing fiber and dispersion managed fiber.

Dispersion decreasing fiber has a slow change in dispersion over the length of the fiber. This gradually decreases the dispersion in the fiber and thus decreases the effect of attenuation losses on the transmission of a soliton pulse traveling along the fiber.

Dispersion managed fiber is characterized by sections of positive and negative dispersion, with relatively sharp transitions between each section. Dispersion managed fiber strives to create a fiber where the overall dispersion of the fiber is zero, but the dispersion at any one point is either slightly positive or negative. Such a scheme minimizes the effects of four-wave mixing, self phase modulation and other nonlinear optical effects that are produced by transmitting data pulses at the zero dispersion point, while still effectively compensating for the chromatic dispersion effects that occur over the length of the fiber link.

The present invention is directed to methods of making dispersion decreasing and dispersion managed fiber by axially changing the optical properties of the fiber.

Prior art methods of making fiber, having axially changing optical properties, each have associated disadvantages. For example, changing the core-clad ratio, by either machining or chemically etching the consolidated preform or core cane, alters the optical properties of the fiber. Unfortunately, this method adds additional processing steps and additional select losses associated with these steps. Changing the draw tension may also change the optical properties of the fiber axially, but, this method fails to maintain the advantages of drawing fiber in a particular tension regime. Another alternative, altering the optical properties of the fiber by drawing a fiber having a non-constant outer diameter, creates unwanted connectorization and splicing issues. Theoretically, the optical properties of the fiber can be changed by placing multiple overclad compositions on the fiber to obtain stress effects in the drawn fiber. However this method would alter the existing laydown and consolidation processes to such an extent that it would not likely provide a viable manufacturing process.

Thus, there is a need for a method of changing the optical properties of fiber that does not have the disadvantages associated with these prior art methods.

SUMMARY OF THE INVENTION

It is an object of the present invention to provide a method of making dispersion decreasing and dispersion managed fiber without additional manufacturing steps or the select losses associated with such additional steps.

It is a further object of the present invention to provide a method of making dispersion decreasing and dispersion managed fiber which maintains a particular tension regime during the draw process.

It is an object of the present invention to provide a method of making dispersion decreasing and dispersion managed fiber having a constant outside diameter.

It is a further object of the present invention to provide a method of making dispersion decreasing and dispersion managed fiber which does not alter existing laydown and consolidation processes.

It is an object of the present invention to provide a method of making dispersion decreasing and dispersion managed fiber which allows the axial location of change in the dispersion in the fiber to be determined.

The disadvantages and limitations of other methods of changing the optical properties of fiber are overcome by the present invention, which provides a method for separately controlling and varying the input, into a furnace, of core and clad material, and thereby controlling the core diameter of the product which exits the furnace, i.e. either core or fiber, e.g. by drawing a rod and tube simultaneously using separate downfeeds.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The method of the present invention includes mounting (1) a rod containing core glass and possibly a material amount of cladding glass, and (2) a tube of cladding glass, on separate downfeeds going into a draw furnace such that the rod is within the tube. (As those skilled in the art will recognize, "core" glass has a higher refractive index than "clad" glass.) The rod and tube are lowered through the furnace and combine to form a fiber which is drawn from the furnace. The velocity of each downfeed is separately controlled and coordinated such that the mass per unit time of glass passing through the furnace remains constant, while at the same time varying the amount of rod and tube material passing through the furnace.

The resultant fiber (or cane) drawn from the furnace has a constant outside diameter. However, the diameter of the core of the fiber varies along the length of the fiber in accordance with the variance of the amount of tube or rod material passing through the furnace. It is the resulting variance in the core diameter of the fiber which provides axial variation of the optical properties of the fiber.

In making dispersion decreasing fiber, the variance in the diameter of the core is very gradual, to allow for a slow change in dispersion along the length of the fiber. The making of dispersion managed fiber requires more abrupt changes in the diameter of the core of the fiber to create sections of positive and negative dispersion fiber with relatively sharp transitions between each section. Both gradual and abrupt changes in the core diameter of the fiber may be obtained through the process of the present invention.

Figure 1:
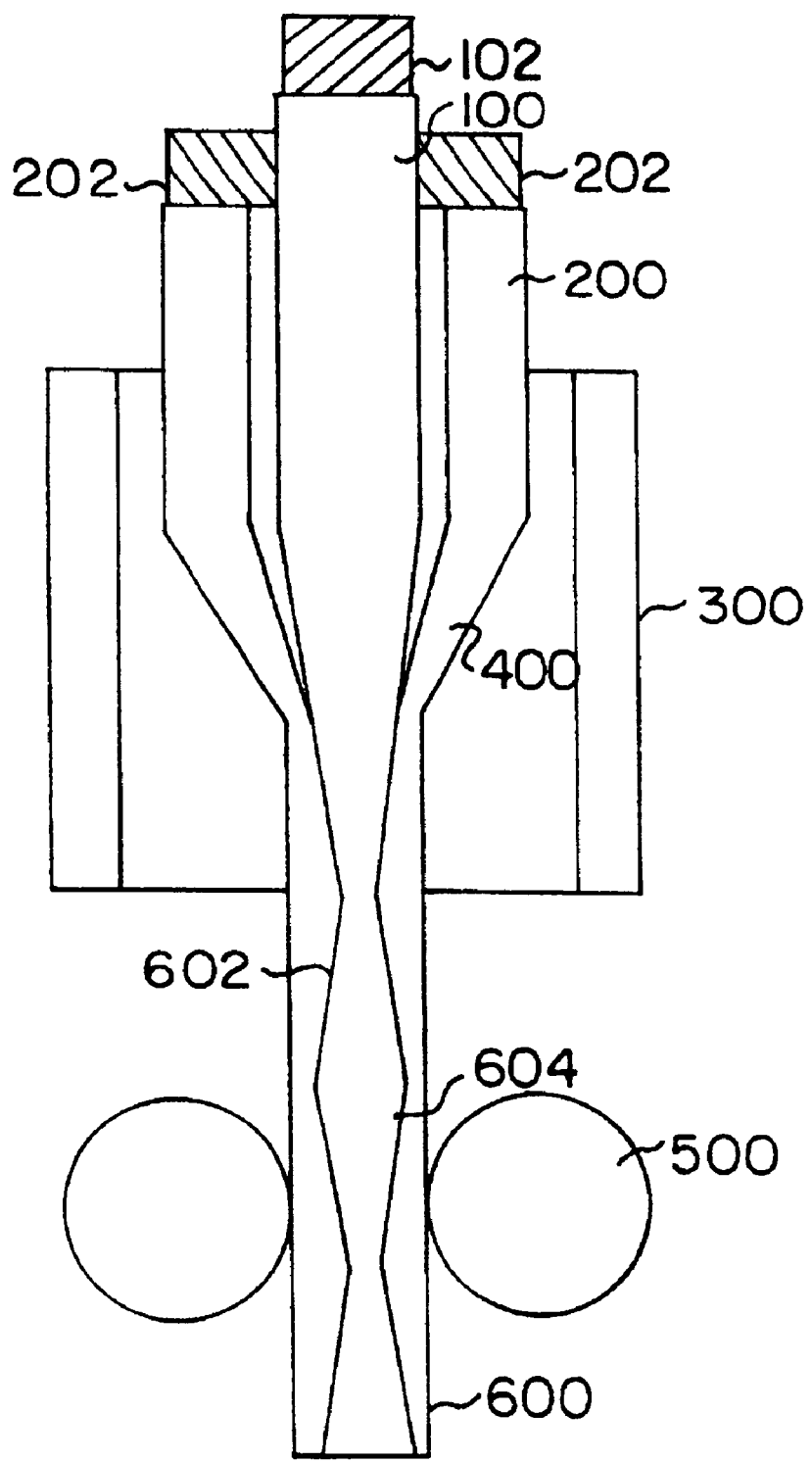
FIG. 1 is a diagram showing an illustrative embodiment of a method of making Dispersion Decreasing and Dispersion Managed Fiber in accordance with the present invention.

FIG. 1 is a generalized illustration of the fiber drawing process of this invention. The rod 100, consisting of all core material and possibly a material amount of cladding is mounted on a downfeed 102. The tube 200, which consists entirely of cladding glass, is mounted on a separate downfeed 202. The clad glass of the tube 200 may be pure silica. A control system 204 may be operated manually or automatically to control the velocity of the downfeeds 102 and 202. The control system 204 includes a programmable controller which includes two motors (not shown), in which the first motor is connected to downfeed 102 and the second motor is connected to downfeed 202. The control system 204, with the use of the motors, controls the velocity of the downfeeds 102 and 202. In controlling the velocity of the downfeeds 102 and 202, the control system 204 insures that the mass per unit time of glass passing through the furnace remains constant, while at the same time varying the amount of rod 100 and tube 200 passing through the furnace 300. The programmable computer is programmed with the desired variation of the core diameter, as a function of fiber length, and receives a feedback signal from the fiber draw system representing draw speed.

The rod 100 and the tube 200 combine in the furnace 300 to form a fiber or cane 600. Cane is thicker and sturdier than fiber, includes an inner core region and a surrounding clad and may later be overclad and drawn into fiber. My invention is applicable both to making fiber or cane. However, by way of illustration, my invention is primarily described herein with reference to making fiber. The fiber or cane 600 is drawn from the furnace by a set of tractors 500.

The principle of operation of the invention is as follows. At steady state, the total amount of glass going into the draw as rod 100 and tube 200 is equal to the amount of glass coming out as fiber 600. This can be represented by the following equation:

$$A_{rod}V_{rod} + A_{tube}V_{tube} = A_{fiber}V_{fiber}$$

where $V_x$=the velocity of the component x; and $A_x$=the cross sectional area of component x.

The diameter of the core of the fiber, $D_{core}$ may be described by the following equation:

$$D_{core} = D_{fiber} * Kf A_{rod}V_{rod}/(A_{rod}V_{rod} + A_{tube}V_{tube})$$

where $D_{fiber}$=fiber diameter;

K=the ratio of the area of the fiber to the sum of the areas of the rod and the tube; and f=the ratio of the area of the core diameter to the outer diameter of the fiber.

The outside diameter of the fiber, $D_{fiber}$, may be described by the following equation:

$$D_{fiber} = 2 * \sqrt{\frac{(A_{rod}V_{rod} + A_{tube}V_{tube})}{V_{fiber}\pi}}$$

Combining the equation for $D_{core}$ and $D_{fiber}$ gives the following expression for $D_{core}$.

$$D_{core} = \frac{2Kf A_{rod}V_{rod}}{\sqrt{V_{fiber}(A_{rod}V_{rod} + A_{tube}V_{tube})\pi}}$$

Each of the terms of this equation can be varied over time. Desirably, the dimensions of the rod and the tube, as they are fed into the furnace, remain constant. It is also desirable that the fiber drawn from the furnace has a constant outside diameter. Therefore, when these factors are constant, K and f are constants. An inspection of the equation for $d_{fiber}$ shows that in order for $d_{fiber}$ to remain constant while $D_{core}$ varies, at least two of the terms must be varied. (Although constant outside diameter is not required for optical properties, it is a desirable attribute for cabling, connecting and splicing.)

Examination of the equation for $D_{core}$ as a function of time shows that $D_{core}$ can be varied in a variety of ways to obtain a fiber having a constant outside diameter. In theory, any two of the variables, $A_{rod}$ $A_{tube}$, $V_{rod}$, $V_{tube}$ or $V_{fiber}$ could be modulated in such a way to produce a fiber having a constant outside diameter. This invention is directed towards those combinations of variables that do not require changing $A_{rod}$ or $A_{tube}$. Using the approach of changing only draw speeds or downfeed speeds makes it possible to correlate changes in the fiber with changes in draw or downfeed speed, that would not be as easily done with changes in $A_{rod}$ or $A_{tube}$.

Three possible combinations of velocities can be varied over time: $V_{fiber}V_{rod}$; $V_{tube}V_{rod}$, and $V_{fiber}V_{tube}$. Varying $V_{rod}V_{tube}$ while holding $V_{fiber}$ constant requires that the mass per unit time of glass passing through the furnace be constant, so there is little or no change in the shape of the root 400 that is normally associated with changes in fiber draw speed. This minimizes unsteady state behavior and makes it easier to control the process. This approach also makes it easier to determine where the changes in the core diameter occur in a fiber by correlating changes in downfeed speed to the length of fiber drawn. There is some lag time between when the downfeed change is made and when the drawn fiber actually starts to change, but under the relatively steady state condition provided by holding $V_{fiber}$ constant, this lag time is fairly constant. This also cuts down on waste which in turn makes the manufacturing of dispersion decreasing and dispersion managed fiber easier and more cost effective.

Figure 2:
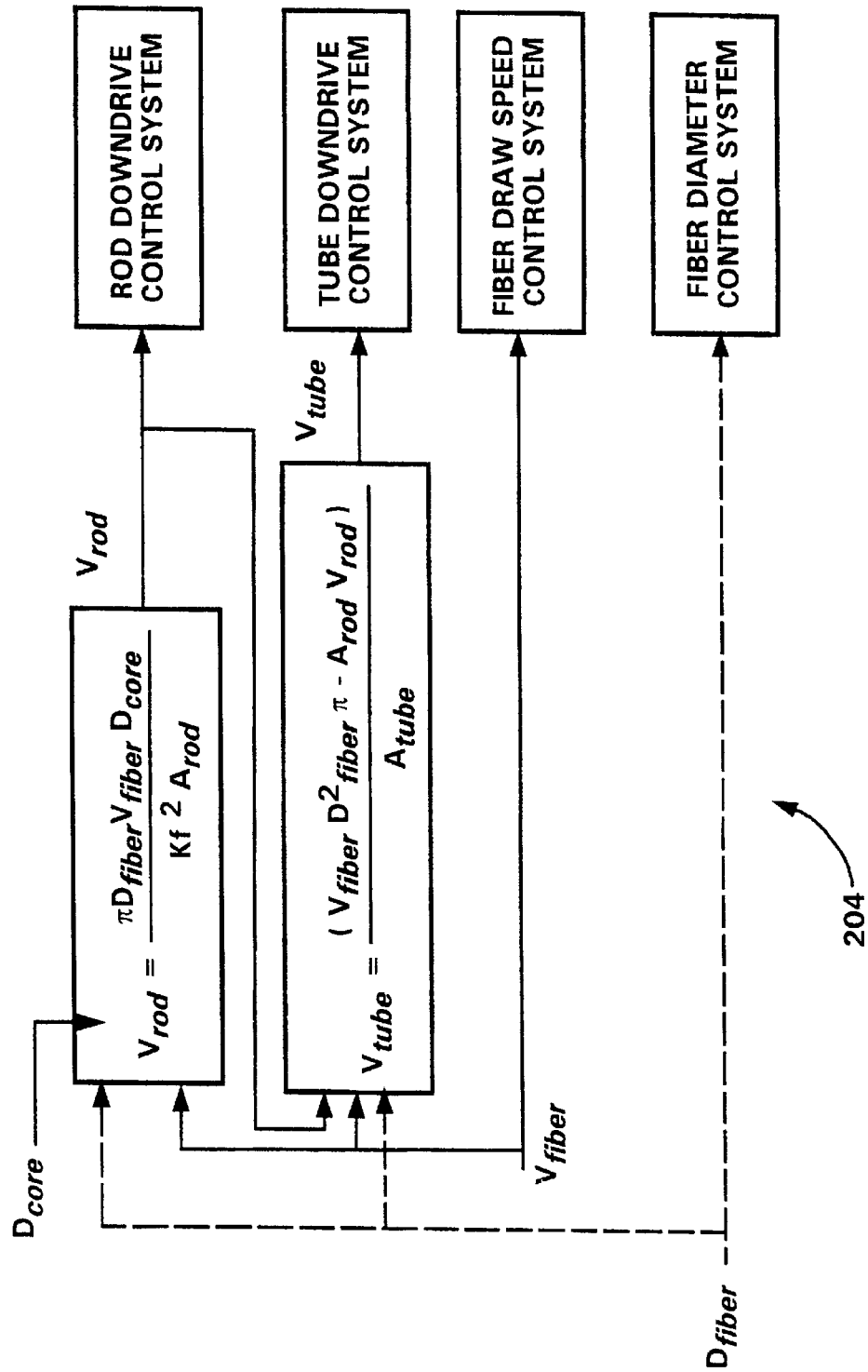
FIG. 2 is a block diagram of a control system of the present invention.

A block diagram of a control system which may be used in the present invention is set out in FIG. 2. The control system may be implemented using conventional components which perform the designated computational functions, e.g. a computer. In this control system, $A_{rod}$, $A_{tube}$, K and f are constants, as the chemical and physical composition of the rod and tube and their cross sectional dimensions, do not vary substantially along their length. The diameter of the fiber, $D_{fiber}$, is set based on the specification of the fiber. A typical value in telecommunication fibers is 125 $\mu$m. $V_{fiber}$ is set or controlled based on the capacity of the draw, and the ability to adequately control any secondary processes, such as coating application in the case of fiber. In general, $V_{fiber}$ is set as high as possible, while still maintaining control of the process to maximize draw capacity.

The value of $D_{core}$ is determined based on the dispersion target for the particular fiber being made and is provided to the control system from the programmable computer. For example, to produce a dispersion decreasing fiber, $D_{core}$ would be slowly decreased over a length of fiber tens of kilometers in length. To produce dispersion managed fiber, the core diameter would be increased and then decreased, as indicated in FIG. 1 by the core portions 602 and 604. The calculation determining the waveguide dispersion may be done separately from the actual control process or directly in the control loop by the determination of $D_{core}$. The calculation may also be incorporated into the control scheme in which case the waveguide dispersion would be an independent variable and $D_{core}$ would depend on the waveguide dispersion. My invention allows the production of a fiber or cane having a core diameter which varies linearly or non-linearly as a function of length.

Once $D_{fiber}$, $V_{fiber}$ and $D_{core}$ are established, $V_{rod}$ is calculated from the following equation, which can be derived from the steady-state mass balance and the expression for $D_{core}$ previously shown:

$$V_{rod} = \pi D_{fiber} V_{fiber} D_{core} / K f^2 A_{rod}.$$

Once $V_{rod}$ has been determined, $V_{tube}$ is calculated from the overall mass balance through the furnace:

$$V_{tube} = (V_{fiber} D^2_{fiber} \pi - A_{rod} V_{rod}) / A_{tube}.$$

To produce a dispersion decreasing fiber $D_{core}$ would be slowly decreased as the rod and tube were drawn into the fiber. As $D_{core}$ is decreased, $V_{rod}$ will be decreased by a factor of:

$$\pi D_{fiber} V_{fiber} / K f^2 A_{rod}.$$

At the same time, $V_{tube}$ will increase by the factor $A_{rod}/A_{tube}$, thereby maintaining a constant mass balance in the furnace.

Similar control schemes may be used for the cases where $V_{tube}$ is held constant and $V_{fiber}$ and $V_{rod}$ are varied, or where $V_{rod}$ is held constant and $V_{fiber}$ and $V_{tube}$ are varied. In the case described above, it is also possible to reverse the calculation of $V_{tube}$ and $V_{rod}$, such that $V_{tube}$ is a function of $D_{core}$ and $V_{rod}$ is calculated from the mass balance.

Thus a method for creating dispersion decreasing and dispersion managed fiber is provided. Although particular illustrative embodiments have been disclosed, persons skilled in the art will appreciate that the present invention can be practiced by other than the disclosed embodiments, which are presented for purposes of illustration, and not of limitation, and the present invention is limited only by the claims that follow.

What is claimed is:

1. A method of making optical fiber or cane having a core and surrounding cladding, which comprises:
   supplying core glass material and cladding glass material to a furnace to provide a volumetric ratio of said core glass material to said cladding glass material;
   varying the volumetric ratio of said core glass material to said cladding glass material supplied to the furnace to provide for a preselected ratio of core glass material to cladding glass material per unit length of optical fiber or cane, wherein said varying the volumetric ratio of said core glass material to said cladding glass material results in the diameter of the core varying alone the length between regions of increasing core diameter and regions of decreasing core diameter;
   combining said core glass material and said cladding glass material in the furnace; and,
   drawing from the furnace an optical fiber or cane having a core with a diameter that vanes along the length of the fiber and a cladding surrounding the core.

2. The method of claim 1, wherein the step of drawing the optical fiber or cane is performed at a constant speed.

3. The method of claim 1, wherein an outer diameter of the optical fiber or cane is constant.

4. The method of claim 3, wherein the diameter of the core of the optical fiber or cane continuously increases.

5. The method of claim 3, wherein said supplying comprises varying a downfeed speed of core glass material between decreasing the speed of core glass material and increasing the speed of core glass material such that the diameter of the core of the optical fiber or cane alternates between at least one region of decreasing diameter and at least one region of increasing diameter along the length of the optical fiber or cane drawn.

6. The method of claim 1 wherein said supplying comprises varying a downfeed speed of core glass material periodically such that variations of the core diameter are periodic along the length of the fiber or cane.

7. The method according to claim 1 wherein said supplying core glass material comprises supplying a rod comprising of core glass material and cladding glass material.

8. The method according to claim 1 wherein the cladding glass material consists of pure silica.

9. The method according to claim 1 wherein said step of drawing comprises an additional step of changing a draw speed during said step of drawing.

10. The method according to claim 1 wherein the core diameter varies non-linearly along the length of the fiber.

11. A method of making optical fiber or cane having a core and surrounding cladding, which comprises:
    feeding core glass and cladding glass into a furnace to provide a volumetric ratio of core glass to cladding glass;
    combining said core glass material and said cladding glass material in the furnace;
    maintaining a constant volumetric flow of glass through the furnace;
    drawing from the furnace an optical fiber or cane which has a lengths, a constant outer diameter, and a core having a core diameter that varies between regions of increasing core diameter and regions of decreasing core diameter;
    providing a first signal representing a desired variation in a diameter of the core of the optical fiber or cane; and
    in response to said first signal, varying the volumetric ratio of said core glass material to said cladding glass material fed into the furnace to provide for a preselected ratio of core glass material to cladding glass material per unit length of optical fiber or cane.

12. The method of claim 11 wherein said feeding comprises varying a downfeed speed of core glass periodically such that variations of the core diameter are periodic along the length of the fiber or cane.

13. The method according to claim 11 wherein said feeding core glass comprises feeding a rod comprising of core glass and cladding glass.

14. The method according to claim 11 wherein said step of drawing comprises an additional step of changing a draw speed during said step of drawing.

15. A method of making a length of optical fiber or cane having a core and surrounding cladding, which comprises:

providing a glass tube which is comprised of cladding glass;

providing a glass rod which is comprised of core glass;

placing said rod in said tube;

attaching one end of said rod to a first drive means;

attaching one end of said tube to a second drive means;

lowering the other end of said rod into a furnace at a first rate and the other end of said tube into the furnace at a second rate to provide a ratio of rod material to tube material;

varying the first rate and the second rate of lowering of said rod and said tube into the furnace so that the ratio of rod material to tube material fed into the furnace varies to provide for a preselected ratio of core glass material to cladding glass material per unit length of optical fiber or cane; and drawing an optical fiber or cane from said furnace which has a cladding with a constant outer diameter and a core with an outer diameter varying between regions of increasing core diameter and regions of decreasing core diameter.

16. The method of claim 15 wherein said lowering the other end of said rod comprises varying a downfeed speed of core glass periodically such that variations of the core diameter are periodic along the length of the drawn optical fiber or cane.

17. The method according to claim 15 wherein the, lass rod further comprises claddings glass.

18. The method according to claim 15 wherein said step of drawing comprises an additional step of changing a draw speed during said step of drawing.

19. The method according to claim 15 further comprising not etching the rod.

20. A method of making optical fiber or cane having a core and surrounding cladding, which comprises:

feeding core glass and cladding glass into a furnace to provide a volumetric ratio of core glass to cladding glass;

combining said core glass material and said cladding glass material in the furnace;

maintaining a constant volumetric flow of glass through the furnace;

drawing from the furnace an optical fiber or cane which has a length and a constant outer diameter;

providing a first signal representing a desired variation in a diameter of the core of the fiber or cane; and in response to said first signal, varying the volumetric ratio of said core glass material to said cladding glass material fed into the furnace to provide for a preselected ratio of core glass material to cladding glass material per unit length of optical fiber or cane, wherein said varying comprises the steps of:

in response to said first signal, varying the rate at which said core glass is fed into the furnace;

generating a second signal representative of the rate at which said core glass is fed into the furnace; and in response to said second signal, varying the rate at which said cladding glass is fed into said furnace.

21. A method of making optical fiber or cane having a core and surrounding cladding, which comprises:

feeding core glass and cladding glass into a furnace to provide a volumetric ratio of core glass to cladding glass;

combining said core glass material and said cladding glass material in the furnace;

maintaining a constant volumetric flow of glass through the furnace;

drawing from the furnace an optical fiber or cane which has a length and a constant outer diameter;

providing a first signal representing a desired variation in a diameter of the core of the fiber or cane; and in response to said first signal, varying the volumetric ratio of said core glass material to said cladding glass material fed into the furnace to provide for a preselected ratio of core glass material to cladding glass material per unit length of optical fiber or cane, wherein said varying comprises the steps of:

in response to said first signal, varying the rate at which said cladding glass is fed into the furnace;

generating a second signal representative of the rate at which said cladding glass is fed into the furnace; and, in response to said second signal, varying the rate at which said core glass is fed into said furnace.

* * * * *